United States Patent [19]

Green et al.

[11] 4,412,167

[45] Oct. 25, 1983

[54] POLYPHASE POWER FACTOR CONTROLLER

[75] Inventors: Dan Green, Cranford, N.J.; Sandor Goldner, Brooklyn, N.Y.

[73] Assignee: Cynex Manufacturing Corporation, Hillside, N.J.

[21] Appl. No.: 248,990

[22] Filed: Mar. 30, 1981

Related U.S. Application Data

[63] Continuation-in-part of Ser. No. 166,046, Jul. 7, 1980.

[51] Int. Cl.³ .............................................. H02P 5/40
[52] U.S. Cl. .................................... 318/729; 318/812
[58] Field of Search ....................... 318/729, 812, 430; 328/133; 323/241, 322, 238; 324/84 A, 84 D; 307/514; 361/33, 98

[56] References Cited

U.S. PATENT DOCUMENTS

| | | | |
|---|---|---|---|
| 3,536,957 | 10/1970 | Iverson et al. | 361/33 |
| 3,976,919 | 8/1976 | Vandevier et al. | 324/83 D |
| 4,007,401 | 2/1977 | Kimmel et al. | 361/98 |
| 4,070,605 | 1/1978 | Hoeppner | 318/809 |
| 4,355,274 | 10/1982 | Bourbeau | 318/729 |
| 4,361,792 | 11/1982 | Davis, Jr. et al. | 318/729 |
| 4,361,793 | 11/1982 | Nordell | 318/729 |

OTHER PUBLICATIONS

"Power Factor Controller", NASA Tech. Support Package Brief No. MFS-23280, G. C. Marshall Space Flight Center, Alabama 35812.

*Primary Examiner*—David Smith, Jr.
*Attorney, Agent, or Firm*—Goodman & Teitelbaum

[57] ABSTRACT

A power factor controller for an AC induction motor which includes a control circuit adapted to be electrically connected in series with the motor for controlling the voltage applied to the motor. A sensing circuit provides phase lag signals corresponding to the difference in phase between the current through the motor and voltage across the motor. An oscillation circuit produces a cyclical output whose frequency is variable and is dependent on the value of the phase lag signal. A counter receives the cyclical output and produces a control signal corresponding to a predetermined cycle count of the cyclical output so that the duration of the control signal is dependent upon the phase difference. The control signal is applied to the control device for controlling the conduction angle of the voltage applied to the motor to thereby provide power to the motor in accordance with motor loading. Additionally, both soft start and hard start circuits are included and current limit or current trip circuits are provided for starting and running of the motor. A polyphase power factor controller is described and an additional phase loss lockout protection circuit is included.

7 Claims, 5 Drawing Figures

4,412,167

POLYPHASE POWER FACTOR CONTROLLER

RELATIONSHIP TO OTHER APPLICATIONS

This application is a continuation-in-part application to Ser. No. 166,046, filed on July 7, 1980 by the present inventors for "Power Factor Controller", the entire application of which is hereinincorporated by reference.

BACKGROUND OF THE INVENTION

This invention relates to a power factor controller which reduces power consumption of a motor at reduced loading, and more particularly to a polyphase power factor controller for use with a line voltage of various phases, typically a three phase line.

In the aforementioned parent application there was described an improved power factor controller for an AC induction motor which samples line voltage and current through a motor and decreases power input to the motor in proportion to the detected phase displacement between the current and voltage to thereby provide less power to the motor as it is loaded. The use of such power factor controller provided improved efficiency to an AC induction motor.

In one embodiment described in the aforementioned parent application there is provided a digital power factor controller circuit which developed a pulse signal representative of the phase lag between voltage and current for each cycle. In that embodiment, a fixed clock is utilized which produced output clock signals at a fixed frequency. A control pulse is developed, the width of which is dependent upon the phase lag signal. The clock pulses are then permitted to be combined with the phase lag signal whereby the number of counts of the clock signal will be dependent upon the width of the phase lag pulse. This number is then counted and subsequently utilized as the control for a triac in series with the motor whereby the turn on time of the triac is dependent upon the phase lag signal.

Although such circuit provides a great improvement over prior art circuits, additional circuitry is needed in order to compare the count of the clock signals with reference clock signals and to subsequently convert such value into a suitable signal for use in controlling the triac.

Additionally, when dealing with a polyphase line voltage, various modifications in the circuitry are needed in order to utilize the concepts of the parent application.

Accordingly, although the aforementioned parent application provides numerous novel features, the present invention provides additional improvements over such power factor controller circuits which are now described.

SUMMARY OF THE INVENTION

Accordingly, it is an object of the present invention to provide a power factor controller which improves on the aforementioned power factor controller of the co-pending parent application.

Another object of the present invention is to provide a power factor controller for use with a polyphase line voltage system.

Still another object of the present invention is to provide a digital power factor controller which utilizes a variable controlled oscillator whose output frequency is dependent upon a detected phase lag signal between the current and voltage and utilizing a counter to count a fixed number of the outputs of the oscillator, whereby the duration of time to achieve such count is dependent upon the phase lag.

Yet a further object of the present invention is to provide a power factor controller having a "soft start" which brings the maximum starting voltage to the motor during a gradual increase.

Another object of the present invention is to provide a power factor controller having selective capability of providing a "soft start" or a "hard start" of initial operation of the motor.

Yet another object of the present invention is to provide a power factor controller for a polyphase line voltage including detection means for sensing the loss of one of the phases and shutting down operation of the controller.

Another object of the present invention is to provide a power factor controller which senses the current through the motor and limits the starting current to a maximum value.

Yet another object of the present invention is to provide a power factor controller having a detecting circuit which detects the running current through the motor and limits such current to a maximum value.

Still a further object of the present invention is to provide a power factor controller which continuously senses the current through the motor and inhibits further operation of the controller upon sensing a maximum current for a prolonged period of time.

A further object of the present invention is to provide a power factor controller for use with a polyphase system which has a simplified circuit specifically directed to utilization of such polyphase system.

Briefly, in accordance with an embodiment of the present invention there is provided a power factor controller for an AC induction motor which includes a control device adapted to be electrically connected in series wih the motor for controlling the voltage applied to the motor. A sensing circuit provides a phase lag signal corresponding to the difference in phase between the current through the motor and the voltage across the motor. An oscillation circuit produces a cyclical output whose frequency is variable and is dependent on the value of the phase lag signal. A counter receives the cyclical output and produces a control signal corresponding to a predetermined cycle count of the cyclical output. The duration of the control signal is dependent upon the phase difference. This control signal is then applied to the control device for controlling the conduction angle of the voltage applied to the motor to thereby provide power to the motor in accordance with the motor loading.

In accordance with an embodiment of the invention, the power factor controller is applied onto a polyphase line voltage wherein a separate control element is provided for each phase winding of the motor and a separate phase detecting circuit is provided for each of the phases of the line voltage so as to produce a phase lag signal for each of the phases. A line voltage monitoring circuit monitors all of the phases of the line voltage and inhibits normal operation of the controller in response to the loss of at least one phase of the line voltage.

In an embodiment of the present invention, a start up circuit is provided which responds to initial energization of the motor for gradually bringing to a maximum the input signal applied to the control device and subsequently causes the phase lag signal to take control over the control device.

A fast start up circuit can also be included which applies a maximum input signal immediately to the control means and only subsequently reduces the maximum until the phase lag signal takes over. A switch can be provided for selecting either the slow or fast start up circuits.

In an embodiment of the invention a limit circuit is also included to respond to the current through the motor and inhibit normal operation of the phase detection circuit in response to detecting a current flow greater than a predetermined amount. The limit circuit can either respond to the starting current, or can respond to the running current. Furthermore, in response to reaching a running current greater than a predetermined amount, it can actually cause the entire controller to stop further operations after a predetermined time delay in order to accommodate for over currents.

The aforementioned objects, features and advantages of the invention will, in part, be pointed out with particularity, and will, in part, become obvious from the following more detailed description of the invention, taken in conjunction with the accompanying drawing, which forms an integral part thereof.

DESCRIPTION OF THE PREFERRED EMBODIMENTS

Figure 1A:
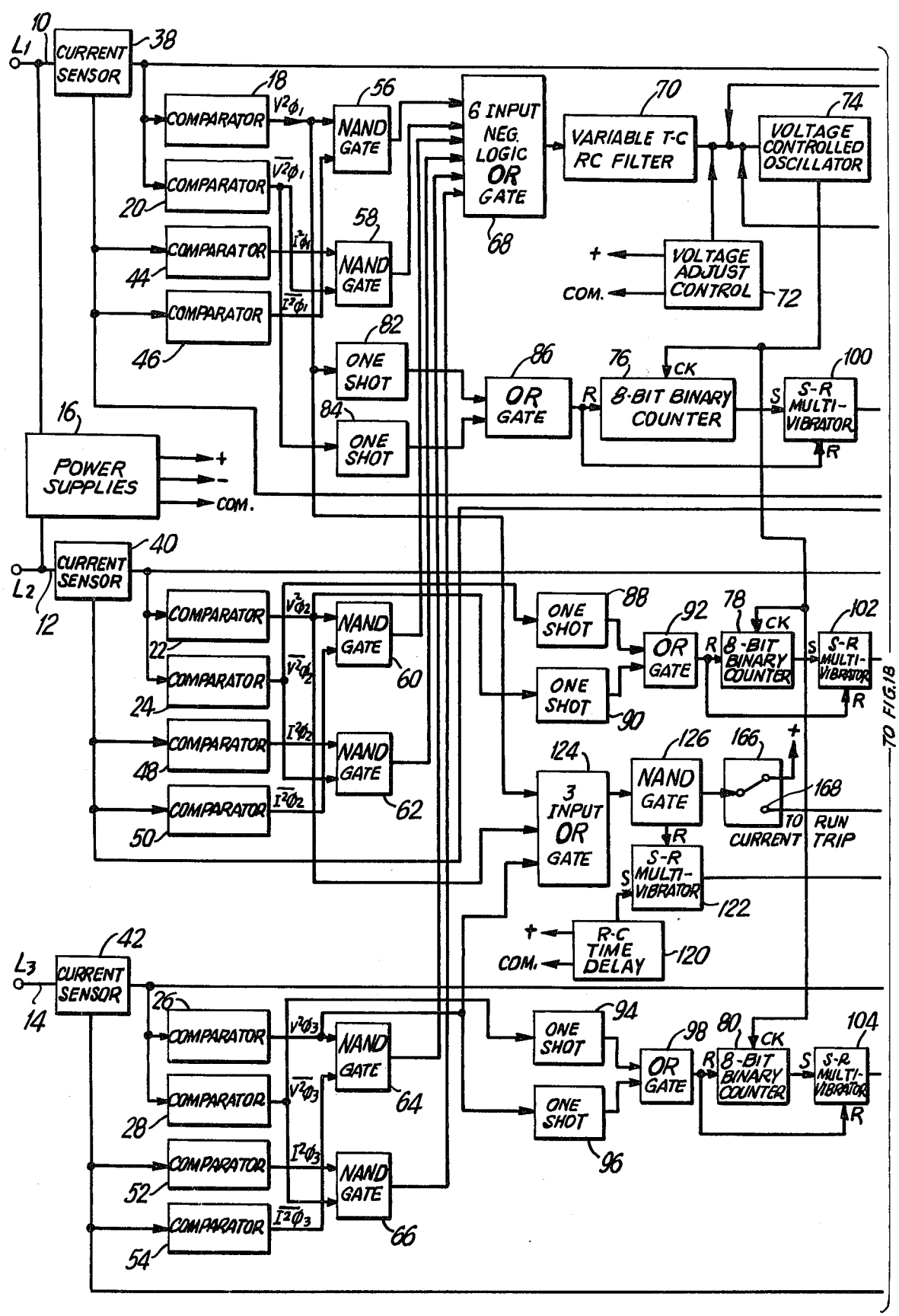
FIG. 1 is a block diagram of a power factor controller in accordance with the present invention, shown as FIGS. 1A and 1B.
Figure 1B:
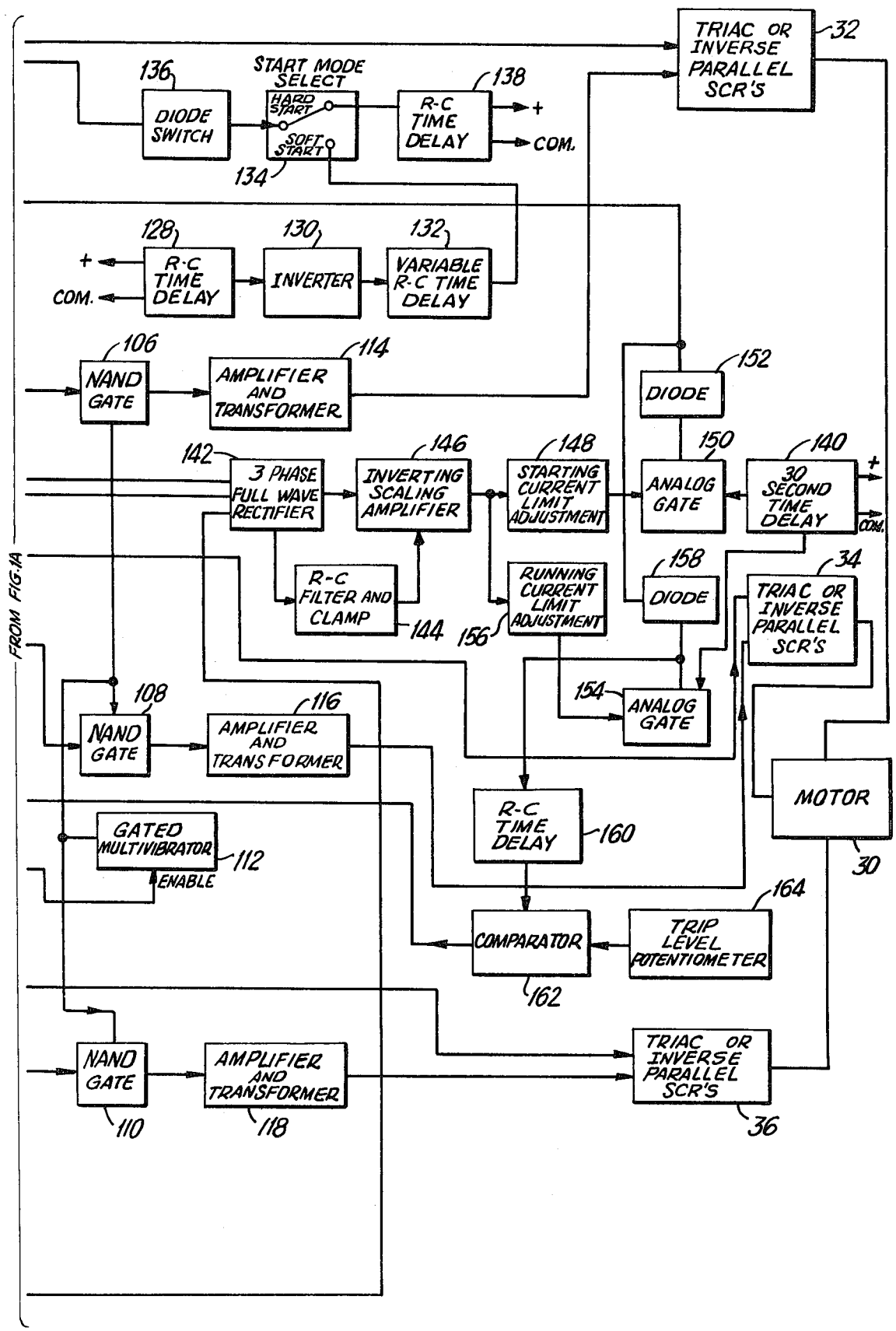

Referring now to FIG. 1, the circuit is shown connected to a three phase line voltage designated by the line-to-neutral voltages L1 on line 10, L2 on line 12 and L3 on line 14. The three voltages of different phases are shown respectively in FIGS. 2A, 2B and 2C. At least one phase of the voltage is utilized to energize the power supply 16 whose outputs are used for energizing various parts of the circuits.

In each phase of the voltage, the voltage is squared by means of a pair of comparators 18, 20 for the first phase, 22, 24 for the second phase, and 26, 28 for the third phase. In each case, the first one of the comparators 18, 22 and 26 produce a squared voltage while the other of the comparators 20, 24, and 28 produce an inversion of the squared voltage signal.

Each of the three phases are applied to a respective motor phase winding of the motor 30. In series with each of the phase windings is provided a control device such as a triac or inverse pair of parallel SCR's. These control devices are shown as 32 for the first phase, 34 for the second phase and 36 for the third phase.

Current sensors 38, 40 and 42 are respectively placed in series with each of the control devices 32, 34, and 36 so as to sense the current flowing into each phase winding of the motor. The currents are then squared by means of a pair of comparators including the comparator 44 and 46 for the first phase, 48, 50 for the second phase, and 52, 54, for the third phase.

The first ones of each of these comparators 44, 48, 52 produce a squared output of the current of each phase. The second ones of the comparators for each phase, specifically 46, 50, 54 produce an inversion of the squared current for each phase.

Figure 2:
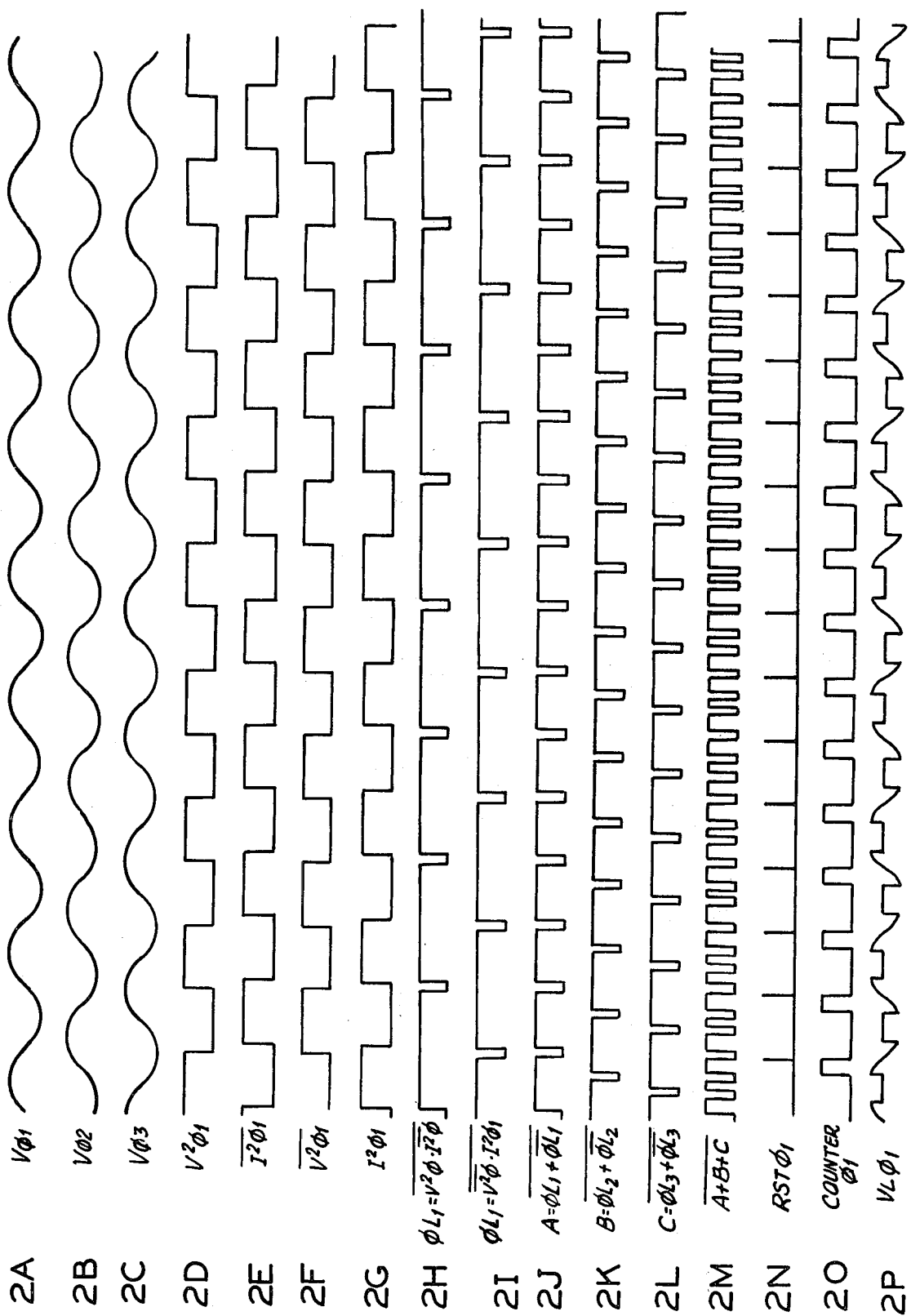
FIGS. 2 (2A-2P) are various waveforms illustrating aspects of the operation of the circuit shown in FIG. 1.

Referring now to FIG. 2, there is shown the waveforms for the first phase, and specifically FIG. 2D shows the squared waveform for the first phase of the voltage; FIG. 2E shows the inversion of the squared current of the first waveform; FIG. 2F shows the inversion of the squared voltage waveform of the first phase, and FIG. 2G shows the squared waveform of the current for the first phase.

The squared voltage of each phase is combined in a NAND gate with the inversion of the squared current of that phase, and likewise the inversion of the squared voltage of each phase is combined in a separate NAND gate with the squared current for that phase. Specifically, in connection with the first phase, NAND gate 56 combines the squared voltage and the inversion of the squared current of the first phase while NAND gate 58 combines the inversion of the squared voltage and the squared current for the first phase. In a similar manner, the NAND gates 60, 62 function for the second phase and 64, 66 function for the third phase.

Each of these gates 56-66 produce an output pulse whose width varies in proportion to the phase shift of the lagging edge of the current waveform with respect to the voltage waveform for each of the respective three phases. In turn, this is proportional to the amount of load on the motor connected to the system.

The outputs of NAND gates 56 and 58 are shown in FIGS. 2H and 2I which represent the phase angle for the first waveform. These two waveforms are combined as shown in FIG. 2J and is identified by the waveform A which combines the two phase angle waveforms of 2H and 2I. In a similar manner, the outputs of the NAND gates 60 and 62 would be combined to produce waveform B shown in 2K and the outputs of the NAND 64 and 66 for the third phase would produce the waveform C shown in FIG. 2L.

The pulses at the outputs of all of the NAND gates 56-66 are then combined in a 6 input negative logic OR gate 68 The output of gate 68 is a series of pulses corresponding to the pulses appearing on its 6 input lines. Such output is shown in FIG. 2M. This represents the combined effect of the phase lag signals of all of the three phases.

The output from OR gate 68, is applied to a variable time constant filter 70 which is essentially a variable resistor in series with a capacitor. Circuit 70 integrates the pulses appearing at the output of the OR gate 68 in order to produce a proportional DC signal at its output. The time constant of circuit 70 is made variable in order to allow the system damping factor to be optomized.

When the damping factor is optomized, the system varies the motor voltage turn on delay so as to counteract any tendency for the lagging edge of the current waveform to rapidly oscillate toward and away from the voltage zero crossings. In this manner, the present system overcomes instability problems of prior art designs.

The output of the filter 70 is then a DC signal which becomes more positive as motor loading increases, and on the contrary becomes reduced as motor loading decreases. This signal is added with a voltage from a voltage adjust control circuit 72 which can be a potentiometer. Circuit 72 provides a method of manually adjusting the optimum no load system equilibrium output voltage.

The combined signal from the filter 70 and the potentiometer 72 is provided as the input to the voltage controlled oscillator 74. When the voltage at the input of this oscillator increases, its output frequency increases. On the other hand, when the input voltage decreases, its output frequency decreases.

The output frequency of voltage controlled oscillator 74 is applied to the clock inputs of an 8 bit binary counter associated with each of the three phases. Specifically, counter 76 is provided for the first phase, counter 78 is provided for the second phase, and counter 80 is provided for the third phase. These counters are reset by pulses coinciding with the zero crossings of the line to neutral voltages for each of the three phases.

The reset voltages are obtained by taking the outputs of the squaring comparators for the voltage of each of the phases, passing them through one shots and combining the outputs in an OR gate. Specifically, in first phase, the outputs from the comparators 18, 20 are respectively provided to the one shots 82, 84 whose outputs are then combined in the OR gate 86. Similarly, for the second phase, one shots 88 and 90 receive the outputs from the comparators 22 and 24 and have their outputs combined in the OR gate 92. A similar arrangement is provided for the third phase utilizing the one shots 94 and 86 and combining their outputs with the OR gate 98.

The output from each of the OR gates 86, 92 and 98 are respectively applied as the reset pulses to the counters 76, 78 and 80. This causes the counters to be reset on each zero crossing of their respective phases.

The reset pulse for the first phase is shown in FIG. 2N and can be seen to occur at each of the zero crossings of the squared voltage and the inversion of the squared voltage.

Each counter is set to count a fixed number of cycles from the voltage controlled oscillator. The time it takes to reach that count will be dependent upon the frequency of the output of the oscillator 74. Accordingly, when the voltage at the input to the oscillator 74 is low, representing a reduced load, the frequency at the output of the VCO 74 will be a reduced frequency causing a longer time delay until the counter reaches its prefixed count of cycles. On the other hand, with a higher input voltage to the VCO, there will be a higher frequency which will produce a shorter time delay until the counters respond.

Each counter produces an output pulse upon reaching the predetermined count which will occur at some time delay from the zero crossing reset pulse. This delay depends upon the frequency generated by the VCO 74.

The VCO 74 frequency range is set so that the maximum causes the output from the counters to become a logic 1 near the zero crossings, and the minimum frequency causes the counter outputs to be delay beyond the next zero crossing so that it does not become a logic 1 at all. A typical output from the binary counter 76 of phase 1 is shown in FIG. 2O. The output from each of the three counters 76, 78 and 80 are applied to the inputs of bistable multivibrators 100, 102, 104. When the output from the respective counters 76, 78 and 80 becomes a logic 1, the bistable receiving such output is set, causing its own output to become and stay a logic 1 until the end of the half cycle whereupon it is reset by the same reset pulse indicating the zero crossing of the respective phases. The purpose of the bistables 100, 102 and 104 are to prevent fluctuations in the state of the output which can appear at the output of the counters 76, 78 and 80, from being propagated to the output of the system and thereby causing the triacs to produce triggering anomalies.

The outputs of the bistable multivibrators 100, 102 and 104 are respectively applied to NAND gates 106, 108, 110. Each of these three NAND gates are all enabled by the gated multivibrator 112 whose purpose will be hereinafter be described.

The outputs from the NAND gates 106, 108 and 110 are therefore groups of pulses coinciding with the outputs from the gated multivibrator 112.

The pulses from each of the NAND gates 106, 108 and 110 are then amplified and coupled by a respective amplifier and transformer 114, 116 and 118 for each of the three phases. These outputs are then fed to the three triacs 32, 34 and 36 of the three phase windings. These triacs then conduction angle modulate the applied voltages of the phases L1, L2, and L3 to the motor 30.

The motor can either be Delta or a Wye wound motor. This is in contrast to prior art systems which required a neutral return for imbalanced current and accordingly prior art circuits necessitated the use of only Wye wound motors in order to maintain system stability. In the present circuit, such system stability can be accomplished by excellent resolution and accuracy of the phase control circuits as described and by the special and unique methods employed to generate a current phase lag feedback signal in order to enable the system to regulate motor voltage and power consumption in proportion to the motor loading. Accordingly, while prior art circuits required a Wye wound motor, the present circuit can utilize either Delta or Wye wound motors.

The control of the traic for the first phase is shown in FIG. 2P and shows the conduction angle control of the voltage applied to the phase winding of the motor.

It should be appreciated that the use of the voltage controlled oscillator in conjunction with the counters represent a diametric opposition to the previously described approach in the parent application. In the parent application, a fixed frequency clock was utilized to provide a variable count output whose count depended upon the length of the phase angle. In the present situation, a variable frequency oscillator is used in conjunction with a fixed count whereby the width of the pulse will vary depending upon the frequency and accordingly is indicative of the phase angle.

Since the present system is applied to a three phase power system, there is additionally provided a circuit which will protect against the loss of a particular phase of the input voltage. Referring now to FIG. 1, the energization of the power supply 16 causes the RC time delay 120 to become activated. This in turn controls the setting of the set-reset multivibrator 122. The output of the multivibrator 122 then becomes a logic 1 thereby enabling the gated multivibrator 112. Multivibrator 112 then applies its drive signals to the gates 106, 108 and 110 allowing the output circuits to operate.

Figure 3:
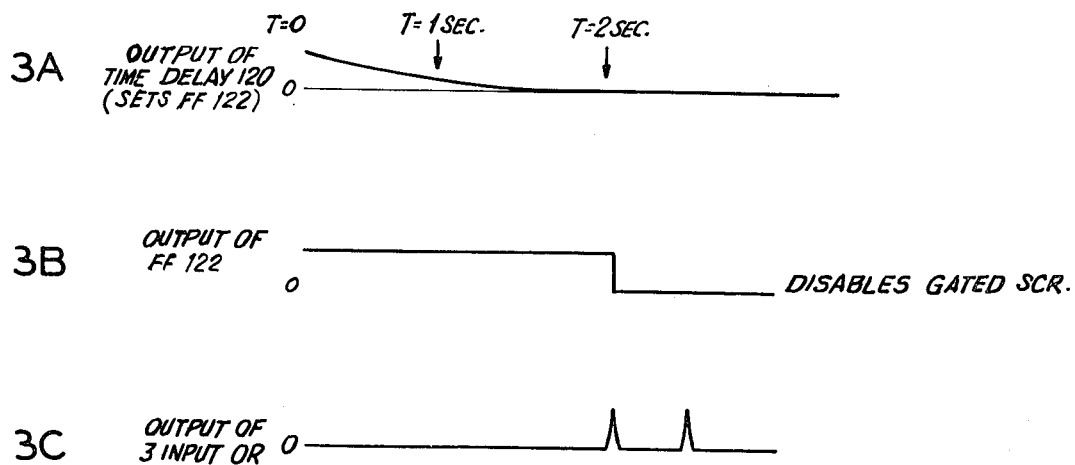
FIGS. 3 (3A-3C) show waveforms illustrating the operation of the phase-loss lockout feature shown in FIG. 1, and FIGS. 4 (4A-4D) show waveforms illustrating the soft start feature shown in the circuit of FIG. 1.

The squared voltage of each of the three phases from the comparators 18, 22 and 26 are set to the three input OR gate 124. If one of the three phases are not present, there will be a non overlap of the three phase signals. Accordingly, three will be a logic zero normally at the output of the three OR gate 124. At the time when a lost phase occurs, a logic 1 will occur which triggers the NAND gate 126 thereby causing a logic 1 to appear at the reset input of the multivibrator 122. This then disables the gated multivibrator 112 which in turn prevents the gate 106, 108, 110 from operating. In this way, the entire controller is disabled and shuts down preventing further operation of the system should any one of the phases become lost. The waveforms explaining the phase loss lockout circuitry is shown in FIG. 3. In FIG. 3A there is shown the decaying time delay which in turn sets the flip flop 122. FIG. 3B shows the output of the flip flop 122 which normally is at a logic 1 to enable the gated multivibrator 112. As shown in FIG. 3C, when a phase is lost, the OR gate produces a signal which changes the output from the flip flop 122 so as to disable the gated multivibrator 112 and shut down the circuit.

Another feature of the present invention concerns the ability of providing soft start to the motor or hard start. Soft start is defined as a slow increasing initializing voltage to the motor until it reaches a maximum and during the maximum period the motor is given a chance to reach full speed. Subsequently, the phase lag controller takes over to provide the necessary efficiency and power consumption saving to the motor. A hard start refers to immediate application of the maximum voltage to the motor and then decaying that maximum voltage until the phase lag system can then take over.

When the power supply is energized, the RC time delay 128 is activated. The fixed time constant of this delay is set at twice the maximum soft start time required. Such delay is shown in FIG. 4A. The time delay signal is fed to an inverter 130 which provides an output which is a logic1 for the first half of the time constant of the delay 28. During this time the variable RC time delay 132 charges up. Its output is during this time an exponentially rising voltage which is applied through the start mode selector switch 134 to the diode switch 136 and then to the input of the voltage controlled oscillator 74.

After one half of the time constant of the time delay 128, the output of inverter 130 becomes a logic zero and the output of the variable time delay 132 then gradually decreases to zero. As the time delay 132 begins decreasing, a point is reached when the diode switch 136 becomes reversed biased. At that point, the output from the controller takes over and the soft start circuit is disconnected from the voltage controlled oscillator and has no further effect.

The soft start control voltage generated by this circuit causes the output voltage of the system to be gradually increased from zero to maximum. After this time, the phase lag control voltage at the output of the RC filter 20 which is then added to the voltage adjust control 72, determines the subsequent operation of the system.

Figure 4:
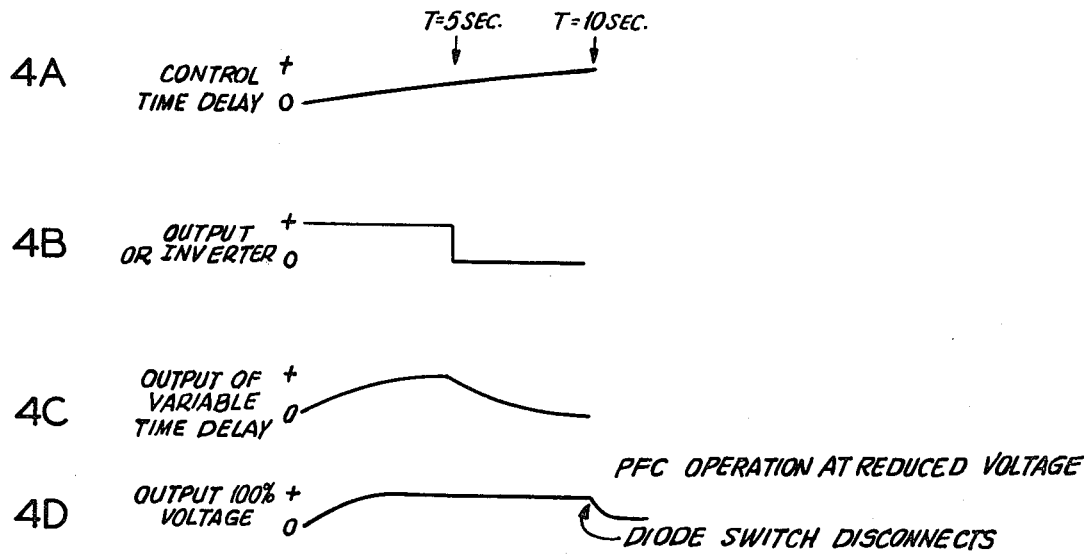

The waveforms associated with the soft start circuit are shown in FIG. 4. The output of the inverter is shown in FIG. 4B and is shown to change during one half of the control of the time delay provided by time delay 128. On the other hand, time delay 130 continues slowly reaching a maximum for the first half of the time and then begins decreasing. At such point when the phase lag control system forward biases the diode switch, as shown in FIG. 4D, the diode switch disconnects and the power factor control operation begins to take over at a reduced voltage which is less than the maximum.

The start mode switch 134 can be placed in the hard start position at which time the soft start circuit is disconnected from the system. The RC time delay 138 begins to charge when the power supply has reached its operating voltage. As the time delay 138 is charging, its output gradually decreases. As this happens, the voltage applied to the motor is initially at a maximum. Gradually, this voltage decreases until the diode switch 136 becomes reversed biased. After that time, the hard start circuit is disconnected from the system and further operation is determined by the phase angle feedback circuit and the output of the filter 70 and the voltage adjustable control 72.

It is therefore appreciated, that selectively a hard start or a soft start can be determined depending upon the particular requirements. In each case, the start up circuit is disconnected when the phase lag system takes over and at that point start up circuitry is disconnected.

The present invention also provides the additional features of monitoring the current through the motor and providing limitations on such current. Specifically, when the power is initially applied to the system, the 30 second time delay 140 is initially activated. It should be appreciated that the 30 second time is arbitrarily selected to provide sufficient time for a start up. A three phase full wave rectifier 142 receives the outputs of the three current sensors 38, 40 and 42 and provides full wave rectification of these currents. The output of the rectifier 142 is applied to the RC filter 144 which converts the rectified current waveform into a proportional DC signal. Circuit 144 also clamps the output of the rectifier 142 so that the voltages remain within safe levels for the remaining circuits.

The output of the filter 144 is applied to an inverting scaling and amplifier circuit 146 which typically reduces the amplitude of the current DC signal and shifts its zero-baseline level. The output of the amplifier 146 is applied to a starting current limit adjustment circuit 148 which can typically be a potentiometer. From the potentiometer 148 the output is applied to an analog gate 150 which is previously enabled by the output of the time delay 140.

The scaled DC current signal is then applied through the diode switch 152 to the input of the voltage controlled oscillator 74. While the starting current limit circuit is activated during the initial time delay, the current signal which is attempting to increase, causes a proportional decreasing signal at the input to the diode switch 152. When diode switch 152 becomes forward biased, the signal level at the input to the voltage controlled oscillator 74 is decreased, thereby causing the system output voltage to be reduced and thereby limiting output current. The starting current limit can be set over a range of 100% to 300% of full load current in order to accommodate a wide variety of starting loads.

With the limit circuit thus described, as the motor starts up, the current is monitored and as the current gets greater than the limitation applied through the potentiometer, the current limit circuit takes over and controls the current within the limit provided. Subsequently, the regular circuitry will take over and change the biasing on the diode 152 to eliminate the limitations of the current limit circuit. It should be understood, that during the use of the starting current limit circuit, both the normal hard starts and the soft start circuits are disconnected.

After the initial time delay provided by the time delay 140, the output from time delay 140 becomes opposite and disables the analog gate 150 while on the other hand enabling the analog gate 154. This enables the running current limit adjustment circuit 156. Circuit 156 operates in a manner similar to that of 148, except that its range is adjustable to allow for a moderate range of running overload, as for example, from 100 to 150%.

The output from the limit adjustment circuit 156 passes through the analog gate 154 and then through diode switch 158 to the input of the voltage controlled oscillator 74. When an overload condition exists, diode 158 becomes forward biased, thereby reducing the signal level at the input to the VCO 74 and reducing the output voltage and current accordingly. When the overload condition passes, the phase lag signal normally coming from the controller will then operate to resume normal control of the system.

Instead of simply limiting the circuit to a fixed current using the limit circuit described, it is possible to actually cause a current trip upon an overload condition which will thereby stop further operation of the system. In this mode utilizing the current trip circuit, the current limit circuit would be omitted.

When utilizing the current trip option, the output from the analog gate 154 is taken through the RC time delay 160 and is applied to one input of the comparator 162. A trip level potentiometer 164 adusts the switching threshold of the comparator 162. When the signal input is higher than that of the setting of the potentiometer 164, its output remains a logic 1. As the signal input to comparator 162 decreases, indicating an increasing current condition, and if such signal passes below the setting of the trip level potentiometer 164, the output of comparator 162 becomes a logic zero. This output from comparator 162 then passes through the switch 166, which is set on the run current trip contact 168. The output then causes a logic 1 at the output of the NAND gate 126 which then sets the multivibrator 122 causing it to disable the gated multivibrator 112 thereby disabling the entire system. The use of the RC time delay 160 is such as the cause that the time required for the current trip to operate should be inversely proportional to the amplitude of the current overload.

Accordingly, the present system describes a polyphase power factor controller which significantly advances the state of the art of solid state motor voltage controls. The system describes one which senses the phase lag between motor voltage and motor current and controls the voltage applied to the motor by means of conduction angle modulation making the applied voltage proportional to phase lag which is in turn proportional to the load on the motor. The system describes a polyphase system, however, it should be appreciated that most of the features described are also applicable to a single phase system. Specifically, there is described a use of a voltage controlled oscillator for producing a variable frequency output signal in conjunction with a fixed counter. Similarly, there is also provided the feature of a timed ramp soft start either alone or in combination with a hard start circuit. There is also provided current limits for both starting and operating circuits as well as current trip control. All of these could be utilized in conjunction with a single phase circuit as well as a polyphase circuit. Furthermore, in conjunction with the polyphase circuit, there is described a phase loss lockout circuit for further motor protection.

By utilizing the features of the present invention, in conjunction with a polyphase circuit, either Delta or Wye wound motors may be used with the system while providing improved efficiency.

There has been disclosed heretofore the best embodiments of the invention presently contemplated. However, it is to be understood that various changes and modifications may be made thereto without departing from the spirit of the invention.

We claim:

1. A power factor controller for an AC induction motor, comprising:

a control means adapted to be electrically connected in series with the motor for controlling the voltage applied to the motor;

sensing means for providing a phase lag signal corresponding to the difference in phase between the current through the motor and the voltage across the motor;

oscillation means for producing a cyclical output whose frequency is variable and is dependent on the value of said phase lag signal; and counter means receiving said cyclical output and for producing a control signal corresponding to a predetermined cycle count of said cyclical output, whereby the duration of said control signal is dependent upon said phase difference, said control signal being applied to said control means for controlling the conduction angle of the voltage applied to the motor to thereby provide power to the motor in accordance with motor landing.

2. A power factor controller as in claim 1, wherein said phase lag signal is a DC level and wherein said oscillation means comprises a voltage controlled oscillator whose output frequency corresponds to the DC level of said phase lag signal.

3. A power factor controller as in claim 2, and further comprising adjustable voltage producing means coupled to the input of said voltage controlled oscillator for producing a no load signal to the oscillator.

4. A power factor controller as in claim 2, wherein said sensing means comprises circuit means for producing square wave pulses whose duty cycle represents the phase displacement between the current and the voltage, and filter means for receiving said square wave pulses and producing said DC level therefrom.

5. A power factor controller as in claim 1, and further comprising trigger means coupled to said sensing means for detecting the zero crossings of the line voltage supplied to the motor and for resetting said counter means each half cycle of the voltage.

6. A power factor controller as in claim 5, and further comprising signal retaining means responsive to said control signals for maintaining a continuous output signal for application to said control means commensurate with the duration of said control signal, thereby being insensitive to fluctuations in said control signal.

7. A power factor controller as in claim 2, wherein the line voltage is a polyphase signal, and comprising a separate sensing means and a separate control means for each phase of the line voltage producing a phase lag signal for each phase, and further comprising combining means for combining all the individual phase lag signals of the different phases, the combined signal being applied to a common oscillation means, and wherein a counter means is provided for each of the line voltage phases, the sensing means of a particular line voltage phase serving to reset the counter means of that phase for each zero crossing of the phase and wherein the output of each counter means is applied to the corresponding control means for that phase.

* * * * *